United States Patent
Lemus et al.

(10) Patent No.: US 9,525,893 B2
(45) Date of Patent: Dec. 20, 2016

(54) METHODS AND SYSTEMS FOR MANAGING STORAGE OF MEDIA PROGRAM COPIES WITHIN A NETWORK DIGITAL VIDEO RECORDING SYSTEM

(71) Applicant: Verizon Patent and Licensing Inc., Arlington, VA (US)

(72) Inventors: Anthony Lemus, Irving, TX (US); Brian F. Roberts, Dallas, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 205 days.

(21) Appl. No.: 14/289,374

(22) Filed: May 28, 2014

(65) Prior Publication Data
US 2015/0350701 A1 Dec. 3, 2015

(51) Int. Cl.
| | |
|---|---|
| H04N 21/472 | (2011.01) |
| H04N 21/231 | (2011.01) |
| H04N 9/80 | (2006.01) |
| H04N 7/173 | (2011.01) |
| H04N 21/239 | (2011.01) |
| H04N 21/2387 | (2011.01) |
| H04N 21/2747 | (2011.01) |

(52) U.S. Cl.
CPC .... H04N 21/23116 (2013.01); H04N 21/2387 (2013.01); H04N 21/2393 (2013.01); H04N 21/23113 (2013.01); H04N 21/2747 (2013.01); H04N 21/47202 (2013.01)

(58) Field of Classification Search
CPC ...................... H04N 21/2747; H04N 21/23116; H04N 21/47202; H04N 21/21815; H04N 21/2183; H04N 21/2393; H04N 21/2387; H04N 21/4135; H04N 7/17336
See application file for complete search history.

(56) References Cited

U.S. PATENT DOCUMENTS

| | | | |
|---|---|---|---|
| 2008/0155059 A1* | 6/2008 | Hardin ............... | H04N 7/17336 709/218 |
| 2012/0210382 A1* | 8/2012 | Walker .............. | G06F 17/30017 725/115 |
| 2013/0142499 A1* | 6/2013 | Major ................ | H04N 21/2323 386/341 |
| 2014/0025837 A1* | 1/2014 | Swenson ........... | H04L 29/06027 709/231 |
| 2014/0165116 A1* | 6/2014 | Major ................. | G06F 21/6218 725/89 |
| 2014/0237525 A1* | 8/2014 | Rothschild .......... | H04N 21/236 725/92 |
| 2014/0282761 A1* | 9/2014 | Bjordammen ....... | H04N 21/231 725/92 |

* cited by examiner

Primary Examiner — Benjamin R Bruckart
Assistant Examiner — Carmine Malangone

(57) ABSTRACT

An exemplary method includes a network DVR system identifying a total number of requests provided by a plurality of users to record a media program during a presentation of the media program, determining, based on the total number of requests and on a predicted playback rate associated with the media program, a maximum number of temporally overlapping playback sessions of the media program that will potentially be initiated by the plurality of users subsequent to the presentation of the media program, and storing, in response to the requests and based on the determining, a plurality of unique copies of the media program. Corresponding systems and methods are also described.

20 Claims, 7 Drawing Sheets

METHODS AND SYSTEMS FOR MANAGING STORAGE OF MEDIA PROGRAM COPIES WITHIN A NETWORK DIGITAL VIDEO RECORDING SYSTEM

BACKGROUND INFORMATION

Traditional digital video recording ("DVR") devices, such as set-top box devices located in subscribers' homes, include hard drives or the like within which recorded media content may be stored for subsequent playback. Unfortunately, a DVR device's hard drive may run out of available storage space after a certain amount of recorded media content data is stored therein.

A network DVR system, on the other hand, may provide virtually unlimited storage capabilities for users of the network DVR system by remotely recording and storing copies of media content (e.g., within one or more network-based servers maintained by a provider of the network DVR system) in response to requests by users to record the media content. The network DVR system may subsequently receive a request provided by a user to play back the recorded media content by way of a local computing device (e.g., a set-top box device, a mobile computing device, etc.), and, in response, provide (e.g., stream) one of the copies of the media content to the local computing device in order to facilitate playback of the recorded media content by the local computing device.

In order to be in compliance with various copyright laws, some conventional network DVR systems record and indefinitely store a unique copy of a media program for each user who provides a request to record the media program, even though a certain percentage of those users may never initiate playback of the media program and even though playback demand for the media program may significantly decrease over time. This can require significant computing (e.g., processing and storage) resources, especially in cases where a relatively large number of users provide requests to record a particular media program.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
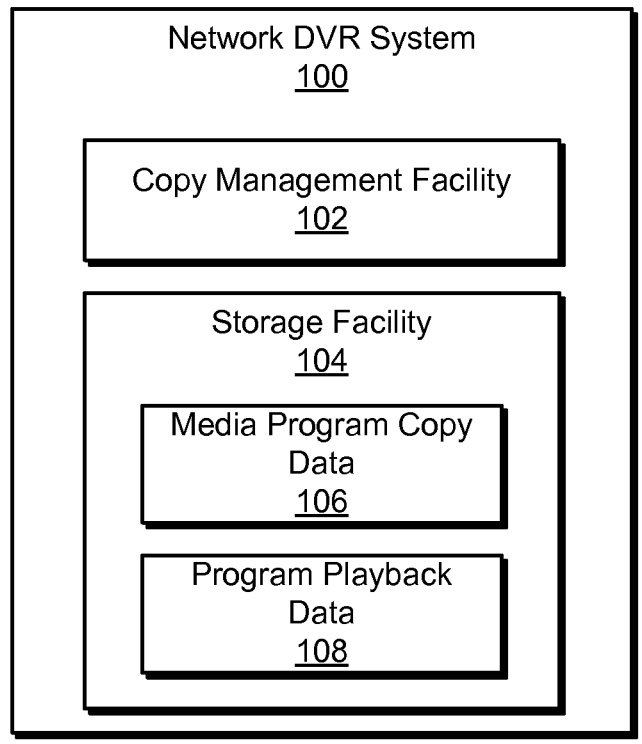
FIG. 1 illustrates an exemplary network DVR system according to principles described herein.

Exemplary methods and systems for managing storage of media program copies within a network DVR system are disclosed herein.

To illustrate, a network DVR system may identify a total number of requests provided by users to record a media program during a presentation of the media program and determine, based on the total number of requests and on a predicted playback rate associated with the media program, a maximum number of temporally overlapping playback sessions of the media program that will potentially be initiated by the users subsequent to the presentation of the media program. As will be described in more detail below, this maximum number of temporally overlapping playback sessions is less than the total number of requests to record the media program. In response to the requests and based on the maximum number of temporally overlapping playback sessions, the network DVR system may store a plurality of unique copies of the media program. The total number of unique copies of the media program that are stored by the network DVR system may, for example, be equal to the maximum number of temporally overlapping playback sessions determined by the network DVR system.

The methods and systems described herein may be relatively more efficient and consume relatively fewer computing resources (e.g., processing and storage resources) than conventional network DVR systems. For example, as mentioned above, some conventional network DVR systems record and indefinitely store a unique copy of a media program for each user who provides a request to record the media program in order to be in compliance with various copyright laws (or other types of laws, contractual agreements, etc.), even though a certain percentage of those users may never initiate playback of the media program and even though playback demand for the media program may significantly decrease over time. This can require significant computing resources, especially in cases where a relatively large number of users provide requests to record a particular media program.

However, in some jurisdictions, a network DVR system may still be in compliance with copyright laws by recording and storing only enough unique copies of a media program to ensure that a unique copy of the media program is available to a user at any given time. Because some users who provide a request to record the media program will never initiate playback of the media program and because some playback sessions of the media program do not overlap temporally, this means that the network DVR system may minimize the number of copies of the media program that are stored and maintained and still be in compliance with copyright laws. The network DVR systems described herein are configured to comply with such copyright laws while at the same time conserving computing resources and maximizing efficiency by dynamically storing and maintaining copies of a media program based on a maximum number of temporally overlapping playback sessions of the media program that are likely to occur at any given time.

FIG. 1 illustrates an exemplary network DVR system 100. As shown, network DVR system 100 may include, without limitation, a copy management facility 102 (or simply "management facility 102") and a storage facility 104.

Facilities 102 and 104 may be communicatively coupled to one another by any suitable communication technologies.

It will be recognized that although facilities 102 and 104 are shown to be separate facilities in FIG. 1, facilities 102 and 104 may be combined into a single facility or split into additional facilities as may serve a particular implementation. Additionally or alternatively, one or more of the facilities 102 and 104 may be omitted from and external to network DVR system 100 in other implementations. Facilities 102 and 104 will now be described in more detail.

Storage facility 104 may be configured to store media program copy data 106 and program playback data 108. Media program copy data 106 may include data representative of one or more unique copies of one or more media programs and/or any other data associated with the unique copies. Program playback data 108 may include data representative of a predicted playback rate associated with a media program, one or more media program attributes associated with a media program, one or more heuristics for determining a predicted playback rate for a media program, etc. Storage facility 104 may maintain additional or alternative data as may serve a particular implementation.

Management facility 102 may perform various operations with respect to copies of media programs that are recorded and stored to facilitate a network DVR service provided by network DVR system 100. For example, management facility 102 may determine how many copies of a media program are to be stored and maintained by network DVR system 100 in response to requests provided by a plurality of users to record the media program. This may be performed in a manner that both minimizes the number of copies that are stored and complies with applicable laws, such as copyright laws that specify that a unique copy of the media program is to be available to any one of the users for playback at any given time.

To this end, management facility 102 may identify a total number of requests provided by a plurality of users to record a media program during a presentation (e.g., a scheduled broadcast) of the media program. As used herein, a "media program" may include a television program, on-demand media program, pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, and/or any other media content instance that may be presented by way of a media content processing device (e.g., a set-top box device, a television device, a computing device, etc.).

Management facility 102 may identify the total number of requests provided by the plurality of users to record the media program during the presentation of the media program in any suitable manner. For example, management facility 102 may count all of the requests to record a particular media program that are received by network DVR system 100 prior to a beginning of the presentation of the media program. In some implementations, management facility 102 may only count requests that include instructions to record the media program in its entirety.

The requests to record the media program may be provided by the users in any suitable manner. For example, one or more of the requests may be provided by one or more users via one or more media content processing devices ("processing devices") communicatively coupled to network DVR system 100 by way of a network.

Figure 2:
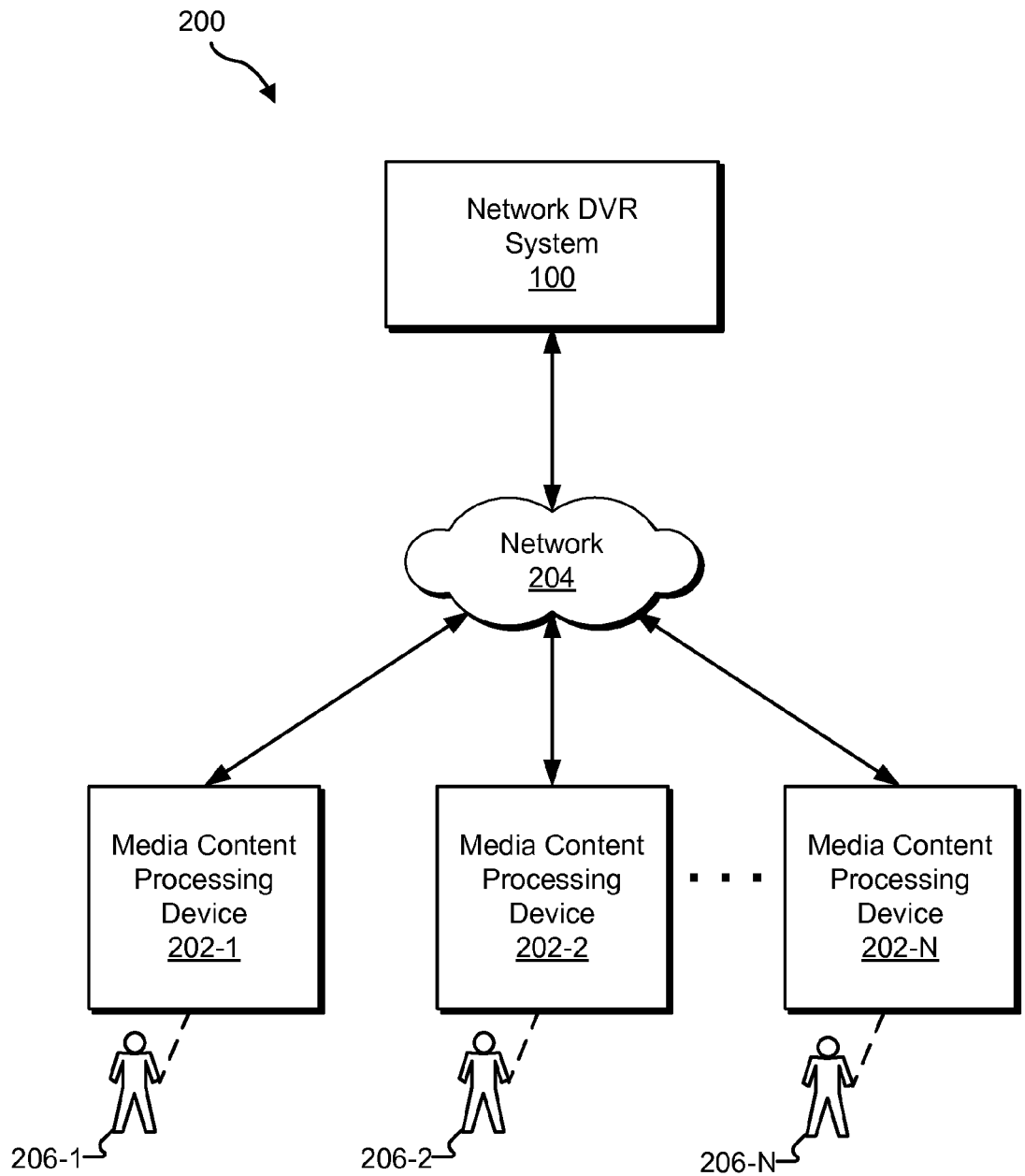
FIG. 2 illustrates an exemplary configuration in which a plurality of media content processing devices are communicatively coupled to a network DVR system by way of a network according to principles described herein.

To illustrate, FIG. 2 shows an exemplary configuration 200 in which a plurality of processing devices 202 (e.g., processing devices 202-1 through 202-N) are communicatively coupled to network DVR system 100 by way of a network 204. Each processing device 202 may be implemented by any device configured to process (e.g., receive, present, and/or play back) media content. For example, each processing device 202 may be implemented by a set-top box device, a DVR device, a television device, a gaming console, a media player computing device (e.g., a media disc player device such as a digital video disc ("DVD") or BLUERAY DISC ("BD") player device), a computer, a mobile device (e.g., a tablet computer or a smart phone device), and/or any other computing device as may serve a particular implementation.

Network 204 may include one or more networks, such as one or more wireless networks (Wi-Fi networks), wireless communication networks, mobile telephone networks (e.g., cellular telephone networks), closed media networks, open media networks, closed communication networks, open communication networks, wide area networks (e.g., the Internet), local area networks, and/or any other network(s) capable of carrying data and/or communications signals between network DVR system 100 and processing devices 202.

Network DVR system 100 and processing devices 202 may communicate using any communication platforms and technologies suitable for transporting data (e.g., data representative of copies of media programs) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

As shown, each processing device 202 is associated with (e.g., used by) a user 206 (e.g., users 206-1 through 206-N). Each user 206 may provide network DVR system 100 with a request to record a media program in any suitable manner. For example, a user (e.g., user 206-1) may provide a request to record a media program by way of a processing device (e.g., processing device 202-1). To illustrate, user 206-1 may select an option within a graphical user interface provided by processing device 202-1 to record the media program. In response, processing device 202-1 may transmit data representative of the request to network DVR system 100. As will be described below, once the media program has been recorded by network DVR system 100, network DVR system 100 may provide a copy of the media program to processing device 202-1 for playback by processing device 202-1.

In some examples, a user may provide a request to record a media program by way of a first processing device and then initiate a playback session of the recorded media program by way of a second processing device. For example, a user may utilize an application (e.g., a "mobile app") executed by a mobile phone to provide a request to record a media program and then subsequently initiate a playback session of the media program by way of a set-top box device.

Returning to FIG. 1, once management facility 102 has identified the total number of requests by the plurality of users to record the media program, management facility 102 may determine a maximum number of temporally overlapping playback sessions of the media program that will potentially be initiated by the plurality of users subsequent to the presentation of the media program.

As used herein, a "playback session" refers to a time period in which a recorded media program is played back (i.e., presented) by a processing device (e.g., any of processing devices 202) for experiencing by a user. A user may initiate a playback session of a media program in any suitable manner. For example, the user may select the media program from a list of recorded media programs (e.g., a list of recorded media programs included in a DVR management interface) presented by the processing device. To facilitate a playback session, network DVR system 100 may provide (e.g., stream) a unique copy of the media program to the processing device. The processing device may then use the unique copy to play back the media program.

As used herein, "temporally overlapping playback sessions" of a media program may refer to two or more playback sessions of the media program that temporally overlap one with another. For example, a first processing device (e.g., processing device 202-1) may use a first unique copy of a media program to play back the media program for experiencing by a first user (e.g., user 206-1) during a first playback session. At any point during the first playback session, a second user (e.g., user 206-2) may initiate a second playback session of the media program by way of a second processing device (e.g., processing device 202-2). While both playback sessions are in progress, they may be referred to as temporally overlapping. In some implementations, temporally overlapping playback sessions may begin and/or end simultaneously. In other implementations, temporally overlapping playback sessions may begin at different times and/or end at different times.

Management facility 102 may determine the maximum number of temporally overlapping playback sessions of the media program that will potentially be initiated by the plurality of users subsequent to the presentation of the media program in any suitable manner. For example, the determination may be based on the total number of requests provided by the plurality of users to record the media program and on a predicted playback rate associated with the media program.

As used herein, a "predicted playback rate" associated with a media program represents a ratio of a predicted maximum number of temporally overlapping playback sessions of the media program that may occur at any point during a time period associated with the predicted playback rate to a total number of requests provided by users to record the media program. In other words, a predicted playback rate may refer to a percentage of recording requests that will potentially "turn into" temporally overlapping playback sessions at any point during the time period associated with the predicted playback rate. For example, a predicted playback rate associated with a media program may be forty percent for a twenty-four hour period following the presentation of the media program during which the media program is recorded. This means that at any given time during the twenty-four hour period, the maximum number of overlapping playback sessions of the media program that will predictably occur is forty percent of the total number of requests received by network DVR system 100 to record the media program.

In some examples, the predicted playback rate may be specific to a particular media program. For example, first and second media programs may have different predicted playback rates, depending on one or more attributes of the media programs. Moreover, a particular media program may have different predicted playback rates that correspond to different time periods that follow the presentation of the media program during which the media program is recorded. For example, the predicted playback rate for a media program may be greater during the first day that follows the presentation of the media program than during the second day that follows the presentation of the media program. Exemplary manners in which management facility 102 may determine and/or access a predicted playback rate for a particular media program will be described in more detail below.

As mentioned, some users who provide a request to record a media program will never initiate playback of the media program. Moreover, some playback sessions initiated during a particular time period associated with a predicted playback rate do not overlap temporally. Hence, the predicted playback rate for a media program will often be less than one-hundred percent (i.e., not all of the recording requests will turn into temporally overlapping playback sessions). This means that the maximum number of playback sessions as determined by management facility 102 will often be less than the total number of requests provided by the plurality of users to record the media program. For example, if the predicted playback rate for a media program is forty percent, and management facility 102 identifies 100,000 requests provided by users to record the media program during a presentation of the media program, management facility 102 may determine that a maximum of 40,000 temporally overlapping playback sessions of the media program will potentially be initiated by the users subsequent to the presentation of the media program during a time period associated with the predicted playback rate. In this particular example, the maximum number of temporally overlapping playback sessions that will potentially be initiated is 60,000 less than the total number of requests provided to record the media program.

In some examples, management facility 102 may determine the maximum number of temporally overlapping sessions that will potentially be initiated by the plurality of users subsequent to the media program being presented by first identifying a time period subsequent to the media program being presented that has the highest predicted playback rate associated therewith and then using the predicted playback rate with the identified time period to determine the maximum number of temporally overlapping sessions. For example, management facility 102 may determine that users are most likely to initiate playback sessions of the media program during a first time period that includes the first twenty-four hours following the presentation of the media program. In response, management facility 102 may use a predicted playback rate associated with the first time period to determine the maximum number of temporally overlapping sessions that will potentially be initiated by the users subsequent to the presentation of the media program.

Management facility 102 may use the determined maximum number of temporally overlapping sessions that will potentially be initiated by the plurality of users subsequent to the media program being presented to determine how many unique copies of the media program are to be stored by management facility 102 in response to the requests to record the media program. Management facility 102 may then store the determined number of unique copies of the media program. As used herein, a "unique copy" of a media program refers to a distinct instance (e.g., file or data set) of the media program and that may be used by a processing device to play back the media program. For example, management facility 102 may store one hundred unique copies of a particular media program by storing one hundred files that are each representative of the particular media program.

In some examples, the total number of unique copies of the media program stored by management facility 102 may be equal to the determined maximum number of temporally overlapping sessions that will potentially be initiated by the plurality of users subsequent to the media program being presented. To illustrate, referring again to the example in which the predicted playback rate for a media program is forty percent, management facility 102 may identify 100,000 requests provided by users to record the media program during a presentation of the media program. Because the predicted playback rate is forty percent, management facility 102 may determine that a maximum of 40,000 temporally overlapping playback sessions of the media program will potentially be initiated by the users subsequent to the presentation of the media program. Management facility 102 may accordingly store 40,000 unique copies of the media program. It will be recognized that management facility 102 may alternatively store any other number of unique copies of the media program based on the determined maximum number of temporally overlapping playback sessions as may serve a particular implementation.

Management facility 102 may store the unique copies of the media program in any suitable manner. For example, management facility 102 may record the presentation of the media program as the media program is being provided (e.g., broadcast, streamed, etc.) by a media content provider system (e.g., a television network provider system) and create the unique copies of the media program from the recording of the presentation of the media program.

In some examples, management facility 102 may notify the plurality of users that the media program is available for playback subsequent to storing unique copies of the media program. This may be performed in any suitable manner. For example, management facility 102 may notify the users that the media program is available for playback by providing, within a user interface presented by processing devices associated with the users, a notification that the media program is available for playback (e.g., by including the recorded media program in a list of recorded media programs displayed within the user interface). Management facility 102 may additionally or alternatively notify the users that the media program is available for playback in any other manner (e.g., by transmitting a text message, email, and/or any other communication to the users).

In some examples, management facility 102 may receive, subsequent to storing the unique copies of the media program, requests provided by at least some of the users to initiate a plurality of playback sessions of the media program by way of a plurality of different processing devices. In some cases, the plurality of playback sessions may temporally overlap one with another, as described above. In these cases, management facility 102 may provide each media content processing device with a different unique copy included in the plurality of unique copies of the media program for use by the processing devices in playing back the media program during the temporally overlapping playback sessions. Management facility 102 may provide a unique copy of the media program to a particular processing device in any suitable manner. For example, management facility 102 may stream or otherwise transmit the unique copy of the media program to the particular processing device by way of a network (e.g., network 204).

In some cases, an actual number of temporally overlapping playback sessions may meet or exceed a predicted maximum number of temporally overlapping playback sessions. This may occur, for example, when an abnormally high number of users initiate playback sessions at or around the same time. Management facility 102 may be configured to compensate for such situations by detecting when an actual number of temporally overlapping sessions exceeds a playback session threshold. The playback session threshold may be less than the predicted maximum number of temporally overlapping playback sessions (e.g., by a predetermined number or percentage, such as ninety-five percent of the predicted maximum number of temporally overlapping playback sessions). In response to the actual number of temporally overlapping sessions exceeding the playback session threshold, management facility 102 may create and store one or more additional unique copies of the media program. In this manner, management facility 102 may ensure that there are enough unique copies of the media program to accommodate any number of playback session initiation requests.

Management facility 102 may dynamically manage the number of copies of the media program that are maintained at any given time. For example, after management facility 102 records and stores a plurality of copies of a media program in response to a plurality of recording requests provided by a plurality of users, a first set of one or more users included in the plurality of users may provide at least one request to delete the media program. The at least one request to delete the media program may be provided in any suitable manner. For example, a user may transmit a command by way of a user interface presented by a processing device for system 100 to delete the media program.

In response to receiving the at least one request to delete the media program, management facility 102 may determine an updated maximum number of temporally overlapping playback sessions of the media program that will potentially be initiated by a remaining set of one or more users included in the plurality of users and that have not provided a request to delete the media program. This determination may be made in any of the ways described herein (e.g., based on the total number of users included in the remaining set of one or more users and on the predicted playback rate associated with the media program). In some examples, the determination is only done if the total number of requests to delete the media program exceeds a deletion request threshold, which may be set to be any suitable number as may serve a particular implementation. By waiting to determine the updated maximum number of temporally overlapping playback sessions until the total number of requests to delete the media program exceeds the deletion request threshold, management facility 102 may conserve processing resources.

Management facility 102 may delete one or more stored copies of the media program based on the updated maximum number of temporally overlapping playback sessions of the media program. For example, management facility 102 may delete a number of stored copies of the media program that is equal to a difference between the maximum number of temporally overlapping playback sessions of the media program and the updated maximum number of temporally overlapping playback sessions of the media program. To illustrate, if the maximum number of temporally overlapping playback sessions of the media program is 40,000, and the updated maximum number of temporally overlapping playback sessions of the media program is 25,000, management facility 102 may delete 15,000 stored copies of the media program.

In some examples, once a user has provided a request to delete the media program, management facility 102 may prevent the user from initiating a playback session of the media program. This may be performed in any suitable manner.

As mentioned, users may become less likely to initiate playback sessions of a recorded media program as time passes after the media program is recorded. For example, users may be more likely to initiate playback sessions of a sporting event immediately after the sporting event occurs than a few weeks after the sporting event occurs. Because of this, management facility 102 may delete one or more stored copies of the media program as user interest in the media program decreases over time.

To this end, a plurality of different predicted playback rates may be associated with a plurality of different time periods subsequent to the presentation of the media program. Each time period may include any suitable amount of time (e.g., a few hours, a day, a week, a month, etc.). Management facility 102 may use the predicted playback rates to dynamically update the number of unique copies of the media program that are stored as time passes subsequent to the presentation of the media program.

For example, management facility 102 may use a first predicted playback rate associated with a first time period that begins subsequent to a presentation of a media program to initially determine a maximum number of temporally overlapping playback sessions of the media program that will potentially be initiated by a plurality of users during the first time period and accordingly store a plurality of unique copies of the media program. Management facility 102 may detect an elapsing of the first time period, and, in response, determine an updated maximum number of temporally overlapping playback sessions of the media program based on a second predicted playback rate associated with a second time period that immediately follows the first time period. Management facility 102 may then delete a number of unique copies of the media program based on (e.g., equal to) a difference between the maximum number of temporally overlapping playback sessions of the media program and the updated maximum number of temporally overlapping playback sessions of the media program.

To illustrate, a first predicted playback rate associated with a first twenty-four hour time period that immediately follows a presentation of a media program may be forty percent. A second predicted playback rate associated with a second twenty-four hour time period that immediately follows the first twenty-four hour time period may be thirty percent. In this scenario, if 100,000 recording requests for the media program are received by management facility 102, management facility 102 may initially store 40,000 unique copies of the media program for use during the first twenty-four hour time period. When the first twenty-four hour time period elapses, management facility 102 may delete 10,000 of the stored unique copies so that 30,000 unique copies of the media program remain for use during the second twenty-four hour time period.

Various ways in which a predicted playback rate associated with a media program may be determined and/or accessed will now be described. In some examples, management facility 102 may access a playback rate associated with a media program by querying a third-party system that maintains data representative of the predicted playback rate. Alternatively, management facility 102 may itself manage (e.g., determine, maintain, and/or update) a predicted playback rate for a media program.

Management facility 102 may determine a predicted playback rate for a media program in any suitable manner. For example, management facility 102 may determine a predicted playback rate for a media program by applying a predicted playback rate generation heuristic to one or more attributes of the media program.

Figure 3:
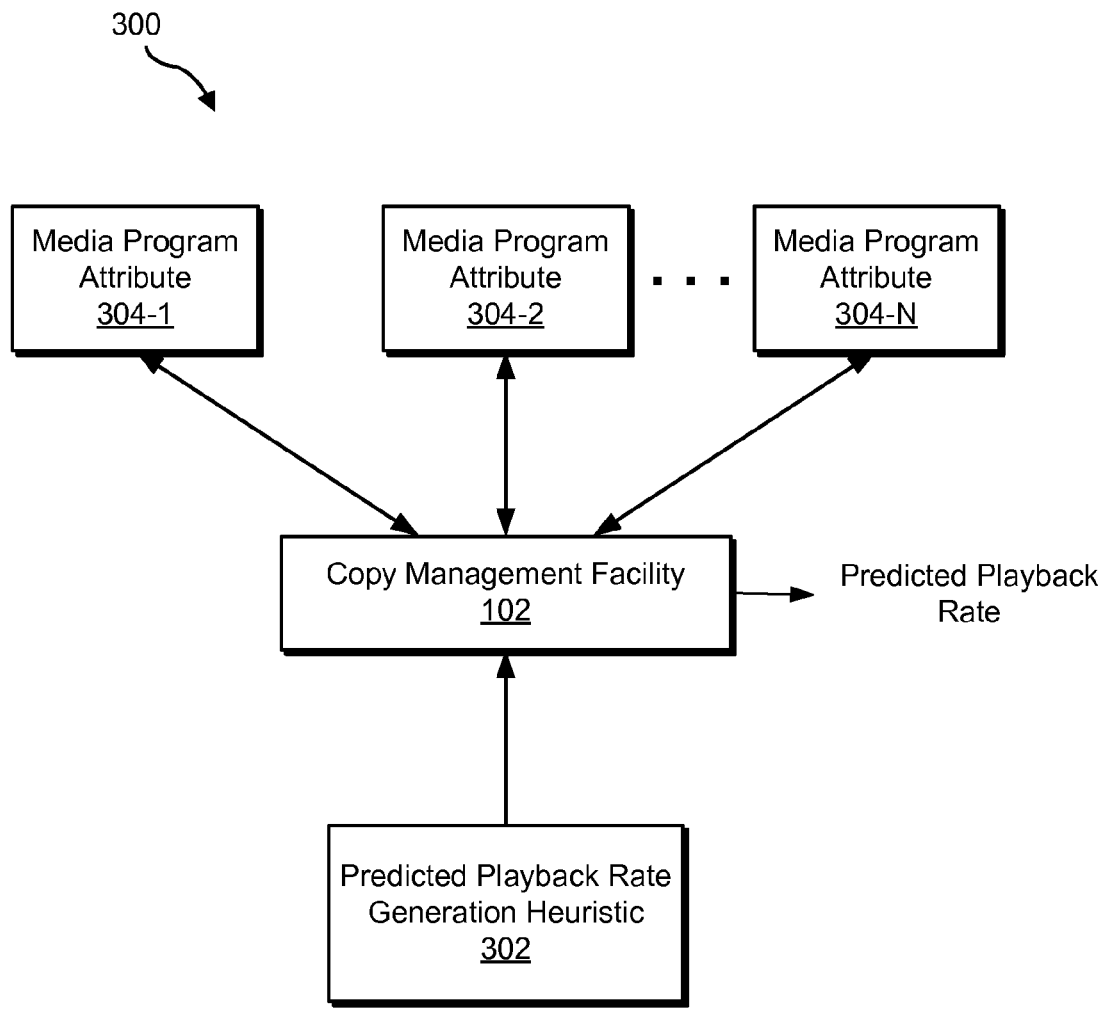
FIG. 3 illustrates an exemplary configuration in which a management facility applies a predicted playback rate generation heuristic to a plurality of attributes of a media program in order to output a predicted playback rate for the media program according to principles described herein.

To illustrate, FIG. 3 shows an exemplary configuration 300 in which management facility 102 applies a predicted playback rate generation heuristic 302 to a plurality of attributes 304 (e.g., media program attributes 304-1 through 304-N) of a media program in order to output a predicted playback rate for the media program. Each media program attribute 304 may be represented in any suitable manner (e.g., by metadata) and may affect the likelihood that a recorded version of the media program will be played back by users subsequent to the media program being presented. Each media program attribute's relative effect on the predicted playback rate may vary. Hence, management facility 102 may weight each media program attribute 304 differently in determining the predicted playback rate as may serve a particular implementation.

Media program attributes 304 may include any attribute of a media program as may serve a particular implementation. For example, a media program attribute 304 of a media program may include a genre associated with the media program (e.g., a sporting event may have a relatively high predicted playback rate for a relatively short period of time following the presentation of the sporting event), a theme associated with the media program, a determined popularity of the media program (e.g., a relatively popular media program may have a relatively high predicted playback rate), an availability of an additional presentation of the media program subsequent to the presentation of the media program (e.g., if the media program is going to be broadcast again within a short amount of time, the predicted playback rate of the media program may be relatively low), an entity (e.g., an actor, director, organization, etc.) associated with the media program, an actual or predicted playback rate of another media program associated with the media program (e.g., if the media program is an episode in a television series, this may refer to an actual or predicted playback rate of another episode in the television series), a newness of the media program (e.g., if the media program is a never-before-seen episode in a television series, the predicted playback rate may be relatively high), a date of the presentation of the media program (e.g., if the media program is presented on a holiday, the predicted playback rate of the media program may be relatively low after the holiday is over), a time of day associated with the presentation of the media program (e.g., if the media program is presented during prime time hours, the media program may have a relatively high predicted playback rate), and/or any other attribute as may serve a particular implementation.

Figure 4:
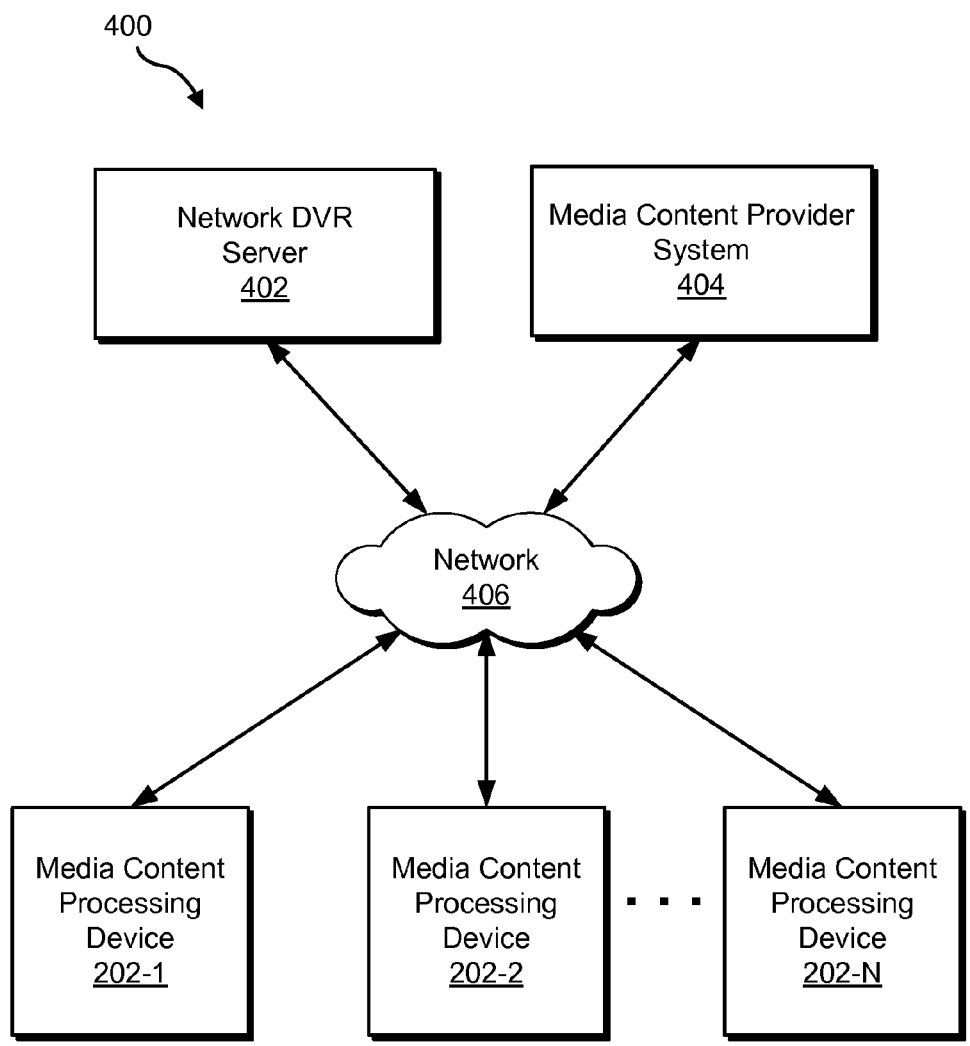
FIG. 4 illustrates an exemplary implementation of the network DVR system of FIG. 1 according to principles described herein.

FIG. 4 illustrates an exemplary implementation 400 of network DVR system 100 wherein a network DVR server 402, a media content provider system 404, and processing devices 202 are communicatively coupled by way of a network 406. Management facility 102 and storage facility 104 may each be implemented by network DVR server 402, media content provider system 404, and/or processing devices 202. Accordingly, in certain embodiments, components of network DVR system 100 may be implemented entirely by network DVR server 402. In other embodiments, components of network DVR system 100 may be distributed across network DVR server 402, media content provider system 404, and/or processing devices 202.

Network DVR server 402 may include one or more servers and/or other computing devices configured to perform one or more of the network DVR operations described herein. Network DVR server 402 may be associated with (e.g., maintained by) a network DVR service provider, a network service provider (e.g., a subscriber television network service provider), and/or any other entity as may serve a particular implementation.

Media content provider system 404 may be associated with a service provider (e.g., a subscriber television service provider, an Internet service provider, etc.), a media content program provider (e.g., ESPN, NBC, etc.), and/or any other type of media content provider. Accordingly, media content provider system 404 may be configured to provide one or more media content services (e.g., television services, video-on-demand services, Internet services, application services, etc.) to processing devices 202. For example, media content provider system 404 may be configured to manage (e.g., maintain, process, distribute, and/or generate) media content (e.g., media content programs, advertisements, etc.) configured to be delivered to processing devices 202. Media content provider system 404 may be implemented by one or more computing devices as may serve a particular implementation. In some examples, media content provider system 404 and network DVR server 402 are managed by the same entity.

Network DVR server 402, media content provider system 404, and processing devices 202 may communicate by way of network 406 using any of the communication platforms and/or technologies described herein. Network 406 may include any suitable network, including any of the networks described in connection with network 204.

Figure 5:
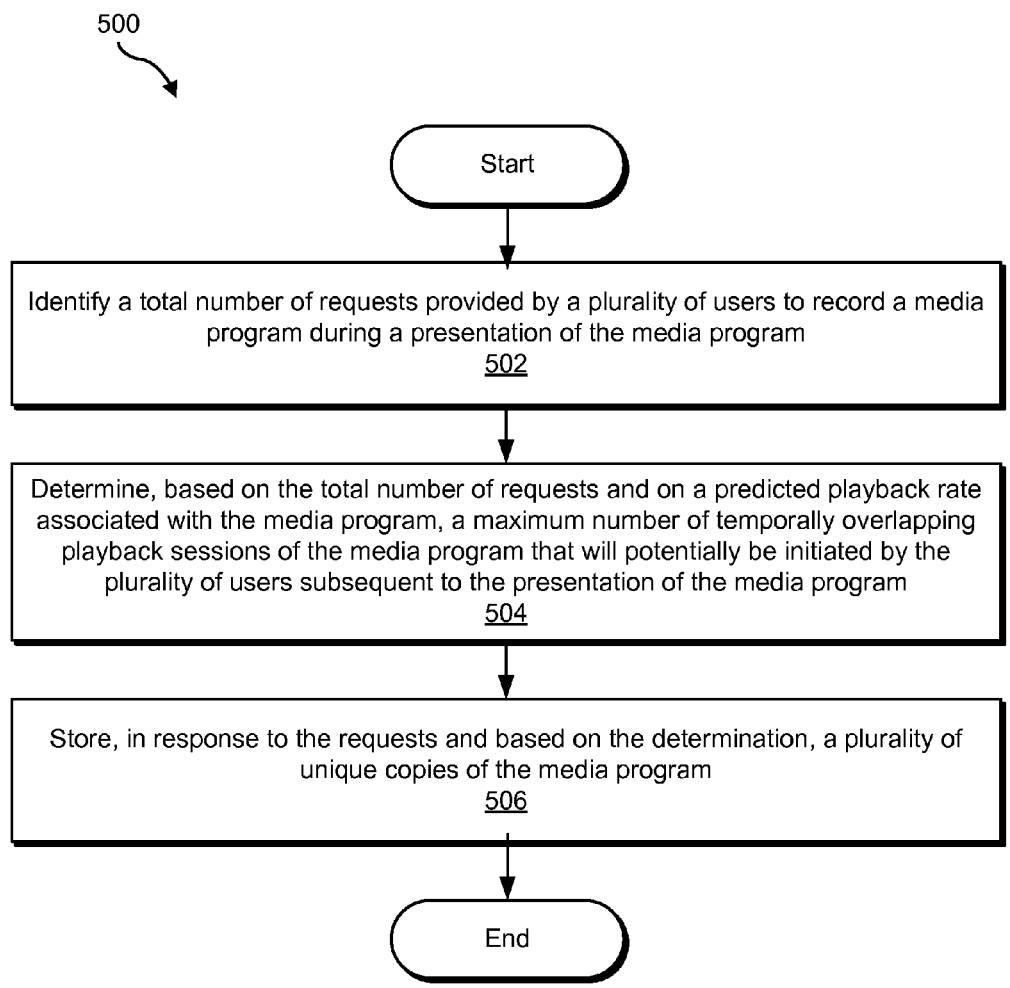
FIGS. 5-6 illustrate exemplary methods for managing storage of media program copies within a network DVR system according to principles described herein.
Figure 6:
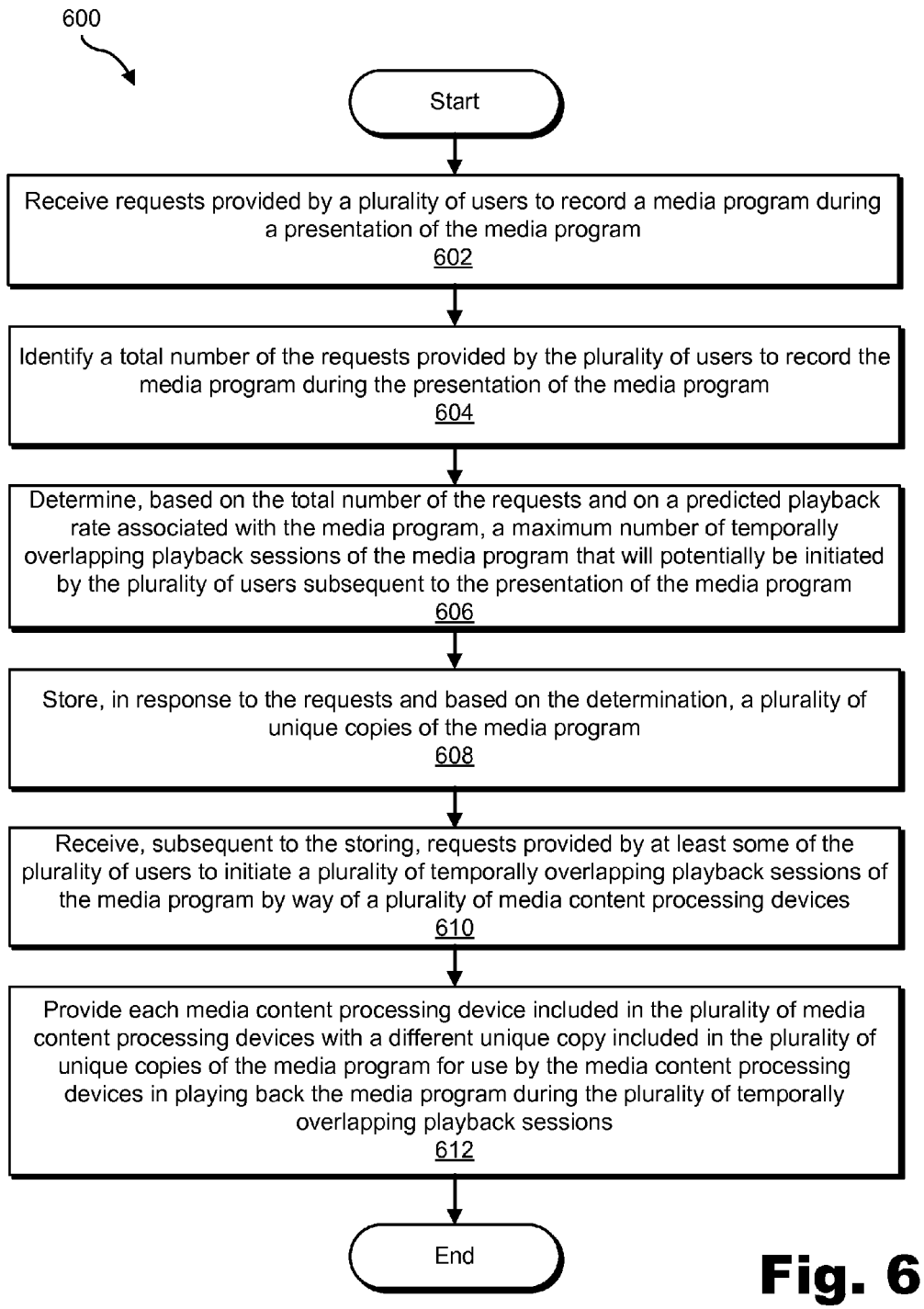

FIGS. 5-6 illustrate exemplary methods for managing storage of media program copies within a network DVR system according to principles described herein. While FIGS. 5-6 illustrate exemplary steps according to certain embodiments, other embodiments may omit, add to, reorder, combine, and/or modify any of the steps shown in FIGS. 5-6. In certain embodiments, one or more of the steps shown in FIGS. 5-6 may be performed by network DVR system 100 and/or one or more components or implementations of network DVR system 100.

Turning to method 500 illustrated in FIG. 5, in step 502, a network DVR system identifies a total number of requests provided by a plurality of users to record a media program during a presentation of the media program. Step 502 may be performed in any of the ways described herein.

In step 504, the network DVR system determines, based on the total number of requests and on a predicted playback rate associated with the media program, a maximum number of temporally overlapping playback sessions of the media program that will potentially be initiated by the plurality of users subsequent to the presentation of the media program. As described above, the maximum number of temporally overlapping playback sessions of the media program may be less than the total number of requests to record the media program. Step 504 may be performed in any of the ways described herein.

In step 506, the network DVR system stores, in response to the requests and based on the determination in step 504, a plurality of unique copies of the media program. Step 506 may be performed in any of the ways described herein.

Turning to method 600 of FIG. 6, in step 602, a network DVR system receives requests provided by a plurality of users to record a media program during a presentation of the media program. Step 602 may be performed in any of the ways described herein.

In step 604, the network DVR system identifies a total number of the requests provided by the plurality of users to record the media program during the presentation of the media program. Step 604 may be performed in any of the ways described herein.

In step 606, the network DVR system determines, based on the total number of the requests and on a predicted playback rate associated with the media program, a maximum number of temporally overlapping playback sessions of the media program that will potentially be initiated by the plurality of users subsequent to the presentation of the media program. As described above, the maximum number of temporally overlapping playback sessions of the media program may be less than the total number of requests to record the media program. Step 606 may be performed in any of the ways described herein.

In step 608, the network DVR system stores, in response to the requests and based on the determination in step 606, a plurality of unique copies of the media program. Step 608 may be performed in any of the ways described herein.

In step 610, the network DVR system receives, subsequent to the storing performed in step 608, requests provided by at least some of the plurality of users to initiate a plurality of temporally overlapping playback sessions of the media program by way of a plurality of media content processing devices. Step 610 may be performed in any of the ways described herein.

In step 612, the network DVR system provides each media content processing device included in the plurality of media content processing devices with a different unique copy included in the plurality of unique copies of the media program for use by the media content processing devices in playing back the media program during the plurality of temporally overlapping playback sessions. Step 612 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 7:
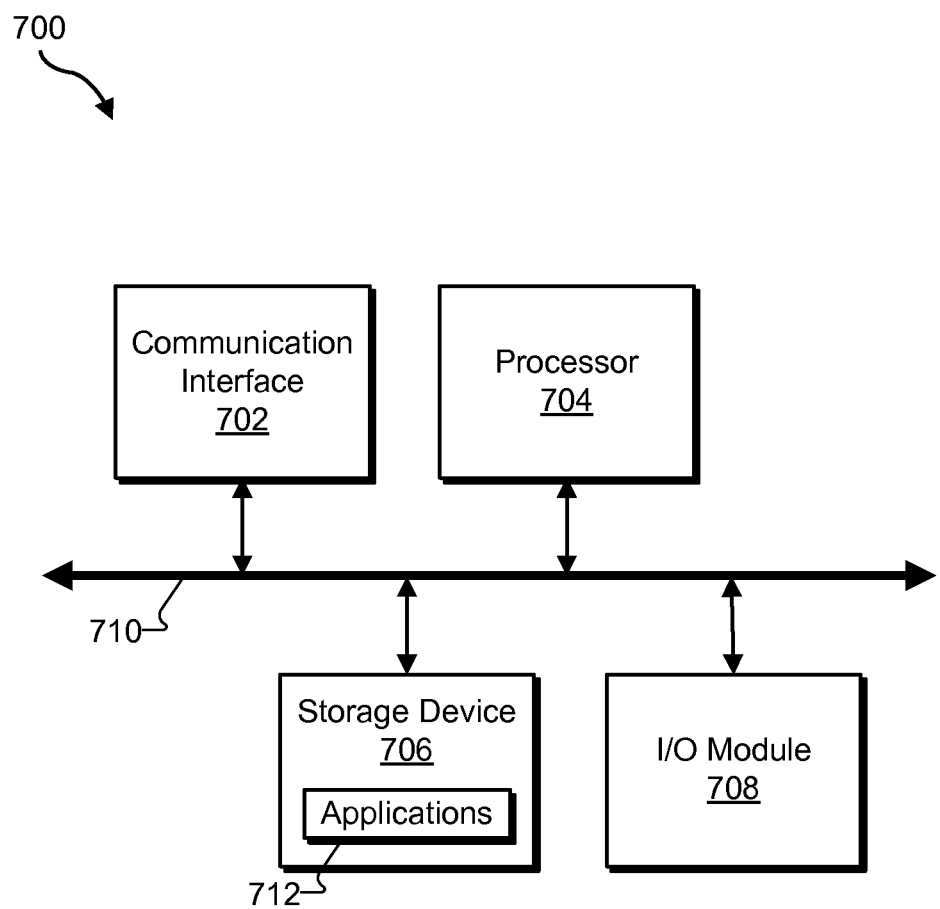
FIG. 7 illustrates an exemplary computing device according to principles described herein.

FIG. 7 illustrates an exemplary computing device 700 that may be configured to perform one or more of the processes described herein. As shown in FIG. 7, computing device 700 may include a communication interface 702, a processor 704, a storage device 706, and an input/output ("I/O") module 708 communicatively connected via a communication infrastructure 710. While an exemplary computing device 700 is shown in FIG. 7, the components illustrated in FIG. 7 are not intended to be limiting. Additional or alternative components may be used in other embodiments. Components of computing device 700 shown in FIG. 7 will now be described in additional detail.

Communication interface 702 may be configured to communicate with one or more computing devices. Examples of communication interface 702 include, without limitation, a wired network interface (such as a network interface card), a wireless network interface (such as a wireless network interface card), a modem, an audio/video connection, and any other suitable interface.

Processor 704 generally represents any type or form of processing unit capable of processing data or interpreting, executing, and/or directing execution of one or more of the instructions, processes, and/or operations described herein. Processor 704 may direct execution of operations in accordance with one or more applications 712 or other computer-executable instructions such as may be stored in storage device 706 or another computer-readable medium.

Storage device 706 may include one or more data storage media, devices, or configurations and may employ any type, form, and combination of data storage media and/or device. For example, storage device 706 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 706. For example, data representative of one or more executable applications 712 configured to direct processor 704 to perform any of the operations described herein may be stored within storage device 706. In some examples, data may be arranged in one or more databases residing within storage device 706.

I/O module 708 may be configured to receive user input and provide user output and may include any hardware, firmware, software, or combination thereof supportive of input and output capabilities. For example, I/O module 708 may include hardware and/or software for capturing user input, including, but not limited to, a keyboard or keypad, a touch screen component (e.g., touch screen display), a receiver (e.g., an RF or infrared receiver), and/or one or more input buttons.

I/O module 708 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 708 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 700. For example, one or more applications 712 residing within storage device 706 may be configured to direct processor 704 to perform one or more processes or functions associated with management facility 102. Likewise, storage facility 104 may be implemented by or within storage device 706.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   identifying, by a network digital video recording ("DVR") system, a total number of requests provided by a plurality of users to record a media program during a presentation of the media program;
   determining, by the network DVR system based on the total number of requests and on a predicted playback rate associated with the media program, a maximum number of temporally overlapping playback sessions of the media program that will potentially be initiated by the plurality of users subsequent to the presentation of the media program, the maximum number of playback sessions being less than the total number of requests;
   storing, by the network DVR system in response to the requests and based on the determining, a plurality of unique copies of the media program;
   receiving, by the network DVR system, at least one request provided by a first set of one or more users included in the plurality of users to delete the media program;
   determining, by the network DVR system in response to the receiving of the at least one request, an updated maximum number of temporally overlapping playback sessions of the media program that will potentially be initiated by a remaining set of one or more users included in the plurality of users and that have not provided a request to delete the media program; and
   deleting, by the network DVR system, a number of the stored unique copies of the media program based on a difference between the maximum number of temporally overlapping playback sessions of the media program and the updated maximum number of temporally overlapping playback sessions of the media program.

2. The method of claim 1, wherein a total number of unique copies of the media program included in the plurality of unique copies of the media program is equal to the determined maximum number of temporally overlapping playback sessions.

3. The method of claim 1, wherein one or more of the requests to record the media program are provided by one or more users included in the plurality of users via one or more media content processing devices communicatively coupled to the network DVR system by way of a network, the one or more media content processing devices configured to enable the one or more users to subsequently initiate one or more playback sessions of the media program.

4. The method of claim 1, further comprising:
determining, by the network DVR system, the predicted playback rate associated with the media program based on at least one of
a genre associated with the media program,
a theme associated with the media program,
a determined popularity of the media program,
an availability of an additional presentation of the media program subsequent to the presentation of the media program,
an entity associated with the media program,
an actual or predicted playback rate of another media program associated with the media program,
a newness of the media program,
a date of the presentation of the media program, and
a time of day associated with the presentation of the media program.

5. The method of claim 1, wherein the storing comprises:
recording the presentation of the media program as the media program is being provided by a media content provider system; and
creating the plurality of unique copies of the media program from the recording of the presentation of the media program.

6. The method of claim 1, further comprising notifying, by the network DVR system subsequent to the storing of the plurality of unique copies of the media program, the plurality of users that the media program is available for playback.

7. The method of claim 1, further comprising:
receiving, by the network DVR system subsequent to the storing, requests provided by at least some of the plurality of users to initiate a plurality of temporally overlapping playback sessions of the media program by way of a plurality of media content processing devices; and
providing, by the network DVR system in response to the receiving of the requests to initiate the plurality of temporally overlapping playback sessions, each media content processing device included in the plurality of media content processing devices with a different unique copy included in the plurality of unique copies of the media program for use by the media content processing devices in playing back the media program during the plurality of temporally overlapping playback sessions.

8. The method of claim 1, wherein the determining of the updated maximum number of temporally overlapping playback sessions and the deleting of the number of the unique copies of the media program are performed in response to the at least one request to delete the media program comprising a number of requests exceeding a deletion request threshold.

9. The method of claim 1, further comprising preventing, by the network DVR system in response to the at least one request provided by the first set of one or more users to delete the media program, the first set of one or more users from initiating a playback session of the media program.

10. The method of claim 1, further comprising:
detecting, by the network DVR system, an elapsing of a first time period associated with the predicted playback rate, the first time period beginning subsequent to the presentation of the media program;
determining, by the network DVR system in response to the elapsing of the first time period, an updated maximum number of temporally overlapping playback sessions of the media program based on an additional predicted playback rate associated with a second time period beginning subsequent to the first time period; and
deleting, by the network DVR system, a number of unique copies of the media program equal to a difference between the maximum number of temporally overlapping playback sessions of the media program and the updated maximum number of temporally overlapping playback sessions of the media program.

11. The method of claim 1, wherein the requests to record the media program during a presentation of the media program comprise requests to record the media program in its entirety.

12. The method of claim 1, further comprising:
determining, by the network DVR system, a playback session threshold for the media program based on the maximum number of temporally overlapping playback sessions and that is less than the maximum number of temporally overlapping playback sessions;
receiving, by the network DVR system subsequent to the storing, requests provided by at least some of the plurality of users to initiate a number of temporally overlapping playback sessions of the media program that exceeds the playback session threshold; and
creating and storing, by the network DVR system in response to the number of temporally overlapping playback sessions exceeding the playback session threshold, one or more additional unique copies of the media program.

13. The method of claim 1, embodied as computer-executable instructions on at least one non-transitory computer-readable medium.

14. A method comprising:
receiving, by a network digital video recording ("DVR") system, requests provided by a plurality of users to record a media program during a presentation of the media program;
identifying, by the network DVR system, a total number of the requests provided by the plurality of users to record the media program during the presentation of the media program;
determining, by the network DVR system based on the total number of the requests and on a predicted playback rate associated with the media program, a maximum number of temporally overlapping playback sessions of the media program that will potentially be initiated by the plurality of users subsequent to the presentation of the media program, the maximum number of playback sessions being less than the total number of requests;
storing, by the network DVR system in response to the requests and based on the determining, a plurality of unique copies of the media program;
receiving, by the network DVR system subsequent to the storing, requests provided by at least some of the plurality of users to initiate a plurality of temporally overlapping playback sessions of the media program by way of a plurality of media content processing devices;

providing, by the network DVR system in response to the receiving of the requests to initiate the plurality of temporally overlapping playback sessions, each media content processing device included in the plurality of media content processing devices with a different unique copy included in the plurality of unique copies of the media program for use by the media content processing devices in playing back the media program during the plurality of temporally overlapping playback sessions;

receiving, by the network DVR system, at least one request provided by a first set of one or more users included in the plurality of users to delete the media program;

determining, by the network DVR system in response to the receiving of the at least one request, an updated maximum number of temporally overlapping playback sessions of the media program that will potentially be initiated by a remaining set of one or more users included in the plurality of users and that have not provided a request to delete the media program; and deleting, by the network DVR system, a number of the stored unique copies of the media program based on a difference between the maximum number of temporally overlapping playback sessions of the media program and the updated maximum number of temporally overlapping playback sessions of the media program.

15. The method of claim 14, wherein a total number of unique copies of the media program included in the plurality of unique copies of the media program is equal to the determined maximum number of temporally overlapping playback sessions.

16. The method of claim 14, embodied as computer-executable instructions on at least one non-transitory computer-readable medium.

17. A system comprising:
at least one computing device that:
  identifies a total number of requests provided by a plurality of users to record a media program during a presentation of the media program,
  determines, based on the total number of requests and on a predicted playback rate associated with the media program, a maximum number of temporally overlapping playback sessions of the media program that will potentially be initiated by the plurality of users subsequent to the presentation of the media program, the maximum number of playback sessions being less than the total number of requests,
  stores, in response to the requests and based on the determining, a plurality of unique copies of the media program,
  receives at least one request provided by a first set of one or more users included in the plurality of users to delete the media program,
  determines, in response to receiving the at least one request, an updated maximum number of temporally overlapping playback sessions of the media program that will potentially be initiated by a remaining set of one or more users included in the plurality of users and that have not provided a request to delete the media program, and
  deletes a number of the stored unique copies of the media program based on a difference between the maximum number of temporally overlapping playback sessions of the media program and the updated maximum number of temporally overlapping playback sessions of the media program.

18. The method of claim 1, wherein:
the predicted playback rate associated with the media program is further associated with a time period beginning subsequent to the presentation of the media program; and
the maximum number of temporally overlapping playback sessions of the media program that will potentially be initiated by the plurality of users includes only playback sessions that all temporally overlap with each other at a point in time during the time period beginning subsequent to the presentation of the media program.

19. The method of claim 14, wherein:
the predicted playback rate associated with the media program is further associated with a time period beginning subsequent to the presentation of the media program; and
the maximum number of temporally overlapping playback sessions of the media program that will potentially be initiated by the plurality of users includes only playback sessions that all temporally overlap with each other at a point in time during the time period beginning subsequent to the presentation of the media program.

20. The system of claim 17, wherein:
the predicted playback rate associated with the media program is further associated with a time period beginning subsequent to the presentation of the media program; and
the maximum number of temporally overlapping playback sessions of the media program that will potentially be initiated by the plurality of users includes only playback sessions that all temporally overlap with each other at a point in time during the time period beginning subsequent to the presentation of the media program.

* * * * *